United States Patent
Murakami et al.

(10) Patent No.: US 8,214,118 B2
(45) Date of Patent: Jul. 3, 2012

(54) CONTROL APPARATUS FOR AUTOMATIC TRANSMISSION

(75) Inventors: Shinichiro Murakami, Okazaki (JP); Masaki Nishide, Okazaki (JP); Tatsuya Oba, Kira (JP)

(73) Assignee: Aisin AW Co., Ltd., Anjo (JP)

( * ) Notice: Subject to any disclaimer, the term of this patent is extended or adjusted under 35 U.S.C. 154(b) by 245 days.

(21) Appl. No.: 12/654,600

(22) Filed: Dec. 24, 2009

(65) Prior Publication Data

US 2010/0168972 A1   Jul. 1, 2010

(30) Foreign Application Priority Data

Dec. 25, 2008 (JP) ................................. 2008-331552

(51) Int. Cl.
*G06F 7/00* (2006.01)
*G06F 17/00* (2006.01)

(52) U.S. Cl. ................. 701/66; 701/51; 701/64
(58) Field of Classification Search .......................... None
See application file for complete search history.

(56) References Cited

U.S. PATENT DOCUMENTS

| | | | | |
|---|---|---|---|---|
| 6,024,670 A | * | 2/2000 | Kitagawa et al. | 477/109 |
| 6,068,576 A | * | 5/2000 | Tsutsui et al. | 477/144 |
| 2007/0298932 A1 | | 12/2007 | Yoneyama | |
| 2008/0021622 A1 | * | 1/2008 | Katakura et al. | 701/61 |
| 2008/0167155 A1 | | 7/2008 | Kawaguchi et al. | |
| 2008/0234088 A1 | | 9/2008 | Kawaguchi et al. | |
| 2008/0300104 A1 | * | 12/2008 | Park et al. | 477/80 |
| 2010/0029439 A1 | * | 2/2010 | Hayashi | 477/156 |
| 2010/0173745 A1 | * | 7/2010 | Hase et al. | 477/5 |

FOREIGN PATENT DOCUMENTS

| | | |
|---|---|---|
| JP | A-11-280882 | 10/1999 |
| JP | A-11-280890 | 10/1999 |
| JP | A-2007-255518 | 10/2007 |
| JP | A-2008-2553 | 1/2008 |
| JP | A-2008-169872 | 7/2008 |
| JP | A-2008-232355 | 10/2008 |
| WO | WO 2009/084294 A1 | 7/2009 |

OTHER PUBLICATIONS

International Search Report mailed Mar. 30, 2010 in International Application No. PCT/JP2009/007160 (with translation).

* cited by examiner

*Primary Examiner* — Thomas Tarcza
*Assistant Examiner* — Nagi Murshed
(74) *Attorney, Agent, or Firm* — Oliff & Berridge, PLC

(57) ABSTRACT

A control apparatus for an automatic transmission including an automatic speed change mechanism that has an input shaft connected to a drive source, an output shaft connected to driving wheels, and a plurality of friction engagement elements, and that performs a shifting operation among a plurality of shift speeds by changing engagement/disengagement states of the plurality of friction engagement elements.

5 Claims, 5 Drawing Sheets

FIG.2

|   | C-1 | C-2 | C-3 | B-1 | B-2 | F-1 |
|---|---|---|---|---|---|---|
| P |  |  |  |  |  |  |
| Rev |  |  | O |  | O |  |
| N |  |  |  |  |  |  |
| 1st | O |  |  |  | (O) | O |
| 2nd | O |  |  | O |  |  |
| 3rd | O |  | O |  |  |  |
| 4th | O | O |  |  |  |  |
| 5th |  | O | O |  |  |  |
| 6th |  | O |  | O |  |  |

* (O): DURING ENGINE BRAKING

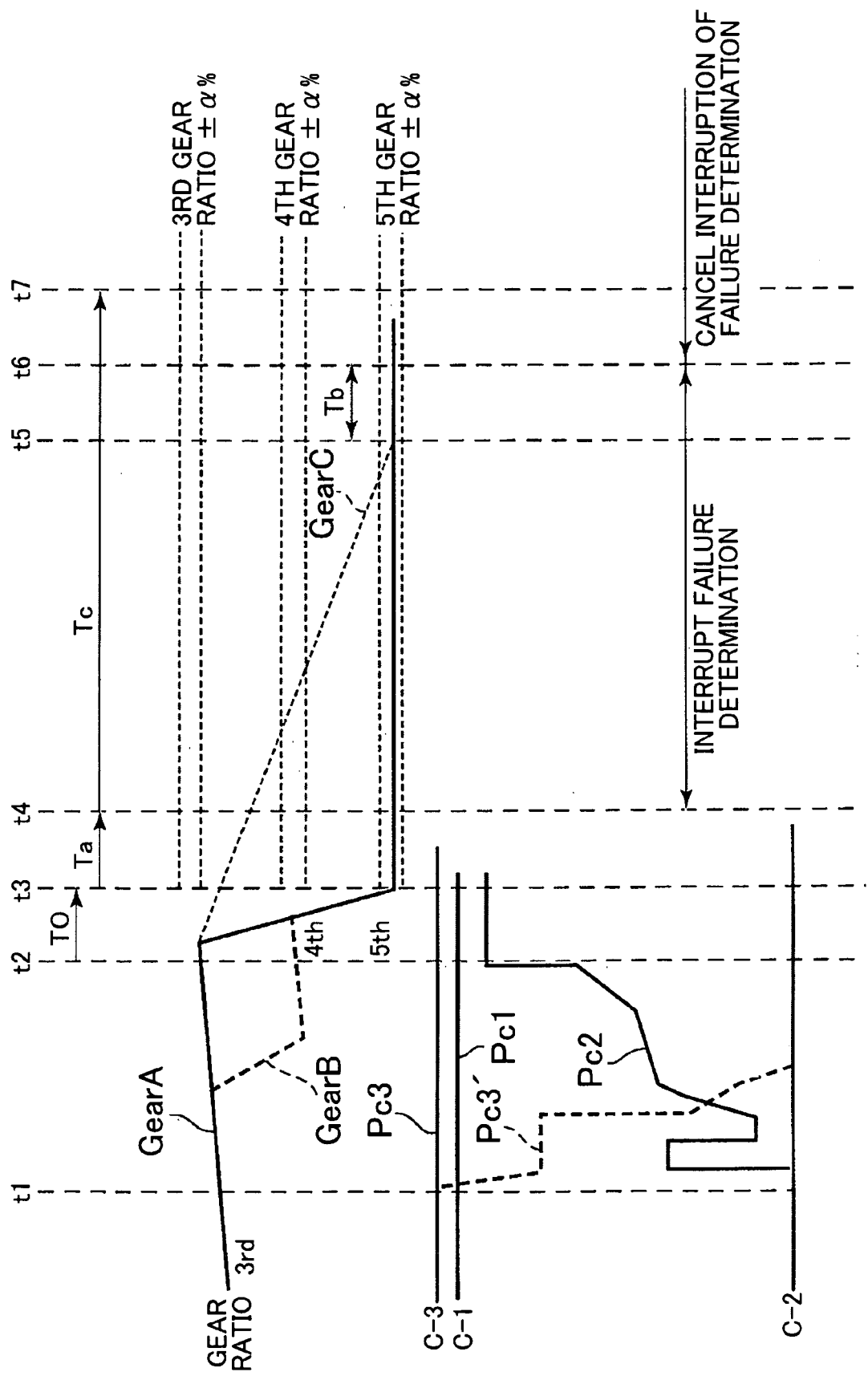

CONTROL APPARATUS FOR AUTOMATIC TRANSMISSION

INCORPORATION BY REFERENCE

The disclosure of Japanese Patent Application No. 2008-331552 filed on Dec. 25, 2008 including the specification, drawings and abstract is incorporated herein by reference in its entirety.

BACKGROUND

The present invention relates to control apparatuses for automatic transmissions that are mounted on vehicles and the like. More particularly, the present invention relates to control apparatuses for automatic transmissions, which determine whether a failure has occurred or not (hereinafter sometimes referred to as a "failure determination") based on the gear ratio, after a shifting operation is performed by changing the engagement/disengagement states of a plurality of friction engagement elements.

In multistage automatic transmissions that are mounted on, e.g., vehicles, a shifting operation is performed by changing the engagement/disengagement state of friction engagement elements such as clutches and brakes. Incidentally, in the above shifting operation for changing the engagement/disengagement states of friction engagement elements, engagement and disengagement of the friction engagement elements are controlled by electrically controlling, e.g., linear solenoid valves in a hydraulic control apparatus. However, there is a possibility that an engagement failure or a disengagement failure occurs for some reason. As used herein, the engagement failure is a failure in which a friction engagement element, which is supposed to be disengaged, is in an engaged state, and the disengagement failure is a failure in which a friction engagement element, which is supposed to be engaged, is in a disengaged state. If such a failure occurs, a failsafe operation needs to be performed according to the failure determination in order to ensure traveling safety. Thus, a shift control apparatus, which makes a failure determination by comparing a gear ratio during a shifting operation (a gear ratio) with a predetermined threshold value, has been proposed (see Japanese Patent Application Publication No. JP-A-2007-255518).

SUMMARY

Although the shift control apparatus of Japanese Patent Application Publication No. JP-A-2008-255518 makes a failure determination during a shifting operation, it is also possible to make a failure determination based on whether the gear ratio after the shifting operation is different from a target gear ratio, that is, based on the state where the gear ratio is established after the shifting operation. However, the following problem occurs when a failure determination is made after the shifting operation. If the above disengagement failure occurs, the friction engagement element is not engaged, and a neutral state is merely established. However, if the above engagement failure occurs, another friction engagement element is engaged in addition to the friction engagement element engaged before the shifting operation, possibly causing engagement of an unnecessary friction engagement element. In order to prevent such unnecessary engagement, the applicant has conceived an idea of providing a cutoff valve for cutting off one oil pressure if an oil pressure of a friction engagement element, which need not be engaged, is applied to a hydraulic circuit, and an idea of reducing a preset oil pressure value so that one friction engagement element slips if a friction engagement element, which need not be engaged, is engaged.

However, even in such structures for preventing simultaneous engagement, it can take a certain amount of time for the gear ratio to become stable, such as, e.g., in the case where the operation of cutting off an oil pressure by the cutoff valve is delayed due to a subtle oil pressure balance, or in the case where simultaneous engagement is avoided by attaining a predetermined shift speed while allowing one of friction engagement elements to slip. Thus, if the gear ratio is not stable (if the gear ratio is varying) at the time of making a failure determination based on the gear ratio, it can be erroneously determined that a disengagement failure has occurred even though an engagement failure has actually occurred. On the other hand, it is possible to make a failure determination some time after the shifting operation. In this case, however, the failure determination is delayed, and thus, failsafe control is delayed accordingly.

It is an object of the present invention to provide a control apparatus for an automatic transmission, which is capable of quickly making a failure determining after a shifting operation, and also capable of improving the accuracy of the failure determination after the shifting operation.

A control apparatus for an automatic transmission according to a first aspect of the present invention, including an automatic speed change mechanism that has an input shaft connected to a drive source, an output shaft connected to driving wheels, and a plurality of friction engagement elements, and that performs a shifting operation among a plurality of shift speeds by changing engagement/disengagement states of the plurality of friction engagement elements, includes: a gear ratio computing unit that computes, as needed, a gear ratio based on a rotation speed of the input shaft and a rotation speed of the output shaft; a first gear ratio establishment determining unit that determines whether the gear ratio computed by the gear ratio computing unit is one of gear ratios of the plurality of shift speeds, during a first predetermined time after completion of the shifting operation; an engagement failure determining unit that determines that such a failure has occurred that one of the friction engagement elements, which is supposed to be disengaged by the shifting operation, is in an engaged state, if the gear ratio computed by the gear ratio computing unit is different from a target gear ratio that is supposed to be established after the completion of the shifting operation; a failure determination interrupting unit that interrupts the failure determination of the engagement failure determining unit, if the first gear ratio establishment determining unit determines that none of the gear ratios of the shift speeds has been established during the first predetermined time; a second gear ratio establishment determining unit that determines, while the failure determination of the engagement failure determining unit has been interrupted by the failure determination interrupting unit, whether any one of the gear ratios of the shift speeds has been established for a second predetermined time; and a failure determination interruption canceling unit that cancels the interruption of the failure determination of the engagement failure determining unit, if the second gear ratio establishment determining unit determines that one of the gear ratios of the shift speeds has been established for the second predetermined time.

More specifically, the control apparatus according to a second aspect of the present invention may further include an input torque calculating unit that calculates torque that is applied to the input shaft. In the control apparatus, the failure determination interruption canceling unit may cancel the interruption of the failure determination of the engagement failure determining unit, if it is determined that one of the gear ratios of the shift speeds has been established for the second predetermined time, and that the input torque that is applied to the input shaft is equal to or higher than predetermined torque.

Moreover, the control apparatus according to a third aspect of the present invention may further include an engagement failsafe unit that performs, if the engagement failure determining unit determines that such a failure has occurred that one of the friction engagement elements, which is supposed to be disengaged when changing the engagement/disengagement states of the plurality of friction engagement elements, is in an engaged state, shift control to attain a shift speed at which the one engaged friction engagement element is used.

More specifically, the control apparatus according to a fourth aspect of the present invention may further include a disengagement failsafe unit that determines that such a failure has occurred that one of the friction engagement elements, which is supposed to be engaged when changing the engagement/disengagement states of the plurality of friction engagement elements, is in a disengaged state, if the second gear ratio establishment determining unit determines that none of the gear ratios of the shift speeds has been established for the second predetermined time during a third predetermined time after the interruption by the failure determination interrupting unit of the failure determination of the engagement failure determining unit.

More specifically, the control apparatus according to a fifth aspect of the present invention may further include a disengagement failsafe unit that performs, if the disengagement failure determining unit determines that such a failure has occurred that one of the friction engagement elements, which is supposed to be engaged when changing the engagement/disengagement states of the plurality of friction engagement elements, is in a disengaged state, shift control to attain a shift speed at which the one disengaged friction engagement element is not used.

According to the first aspect of the present invention, if the first gear ratio establishment determining unit determines that one of the gear ratios of the plurality shift speeds has been established during the first predetermined time after the completion of the shifting operation, and the engagement failure determining unit determines that the computed gear ratio is different from the target gear ratio that is supposed to be obtained by the shifting operation, it can be determined that one of the friction engagement elements, which is supposed to be disengaged by the shifting operation, is in an engaged state. That is, it can be determined that this friction engagement element has an engagement failure. Thus, failsafe control corresponding to the engagement failure (the failure in which the friction engagement element is in an engaged state) can be quickly executed.

On the other hand, if the first gear ratio establishment determining unit determines that none of the gear ratios of the shift speeds has been established during the first predetermined time after the completion of the shifting operation, the failure determination interrupting unit interrupts the failure determination of the engagement failure determining unit. Thus, the state where it is taking a long time for the gear ratio to be stabilized although the friction engagement element has an engagement failure can be prevented from being erroneously determined to be a disengagement failure (a failure in the neutral state).

Moreover, if the second gear ratio establishment determining unit determines that any one of the gear ratios of the gear speeds has been established for the second predetermined time while the failure determination of the engagement failure determining unit has been interrupted by the failure determination interrupting unit, the failure determining interruption canceling unit cancels the interruption of the failure determination of the engagement failure determining unit and the engagement failure determining unit determines that one of the friction engagement elements, which is supposed to be disengaged by the shifting operation, is in an engaged state, that is, the friction engagement element has an engagement failure. Thus, an engagement failure (a failure in which a friction engagement element is in an engaged state) can be accurately determined, whereby corresponding failsafe control can be reliably executed.

That is, by accurately interrupting the failure determination and accurately canceling the interruption, the accuracy of the failure determination can be increased, and the state where a failure has occurred can be reliably and quickly determined as a failure. Thus, the failure determination can be made quickly, and corresponding failsafe control can be reliably and quickly executed.

According to the second aspect of the present invention, if it is determined that one of the gear ratios of the shift speeds has been established for the second predetermined time, and it is determined that the input torque that is applied to the input shaft is equal to or higher than the predetermined torque, the failure determination interruption canceling unit cancels interruption of the failure determination of the engagement failure determining unit. Thus, an engagement failure (a failure in which a friction engagement element is in an engaged state) can be more accurately determined.

According to the third aspect of the invention, the control apparatus includes the engagement failsafe unit. Thus, if the engagement failure determining unit determines that one of the friction engagement elements, which is supposed to be disengaged when changing the engagement/disengagement states of the plurality of friction engagement elements, is in an engaged state (an engagement failure), failsafe control can be executed by performing shift control to attain a shift speed at which the one engaged friction engagement element is used.

According to the fourth aspect of the present invention, if the second gear ratio establishment determining unit determines, during the third predetermined time after interruption by the failure determination interrupting unit of the failure determination of the engagement failure determining unit, that none of the gear ratios of the shift speeds has been established for the second predetermined time, the disengagement failure determining unit determines that one of the friction engagement elements, which is supposed to be engaged when changing the engagement/disengagement states of the plurality of friction engagement elements, is in a disengaged state (a disengagement failure). Thus, a disengagement failure (a failure in which a friction engagement element is in a disengaged state) can be accurately determined, and corresponding failsafe control can be reliably executed.

According to the fifth aspect of the present invention, the control apparatus includes the disengagement failsafe unit. Thus, if the disengagement failure determining unit determines that one of the friction engagement elements, which is supposed to be engaged when changing the engagement/disengagement states of the plurality of friction engagement elements, is in a disengaged state (a disengagement failure), failsafe control can be executed by performing shift control to attain a shift speed at which the one disengaged friction engagement element is not used.

BRIEF DESCRIPTION OF THE DRAWINGS

FIG. 2 is an engagement table of an automatic speed change mechanism;

FIG. 5 is a timing chart showing an example of the failure determination control.

DETAILED DESCRIPTION OF EMBODIMENTS

An embodiment of the present invention will be described with reference to the accompanying drawings.

Figure 1:
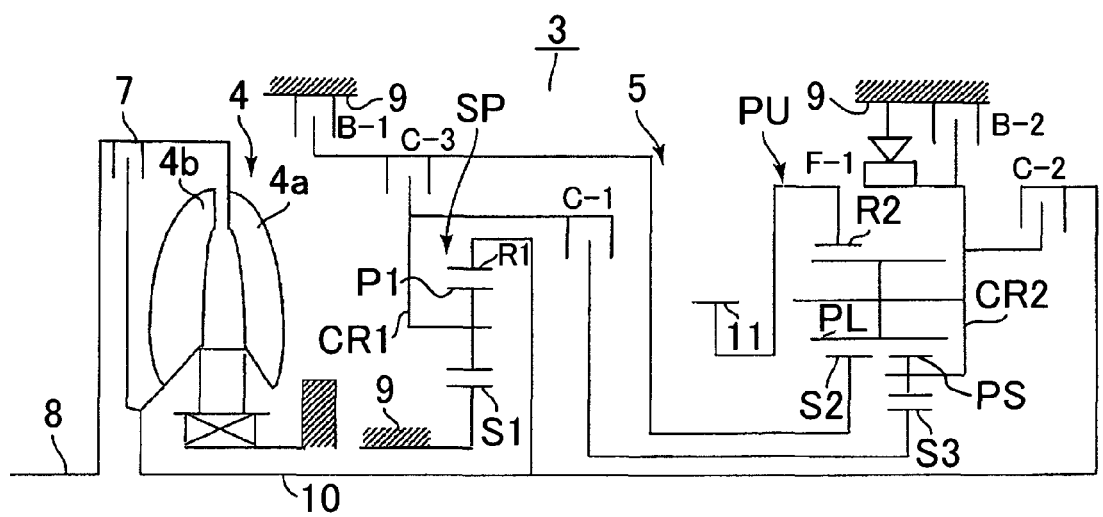
FIG. 1 is a skeleton diagram showing an automatic transmission to which the present invention can be applied.

First, an overview of the structure of an automatic transmission 3 to which the present invention can be applied will be described with reference to FIG. 1. As shown in FIG. 1, the automatic transmission 3, which is preferably used in, e.g., FF type (front engine, front drive) vehicles, has an input shaft 8 of the automatic transmission 3, which can be connected to an engine (a drive source) 2 (see FIG. 3), and includes a torque converter 4 and an automatic speed change mechanism 5, which are disposed about an axial direction of the input shaft 8.

The torque converter 4 has a pump impeller 4a connected to the input shaft 8 of the automatic transmission 3, and a turbine runner 4b to which rotation of the pump impeller 4a is transmitted via a working fluid. The turbine runner 4b is connected to an input shaft 10 of the automatic speed change mechanism 5, which is disposed coaxially with the input shaft 8. The torque converter 4 is provided with a lockup clutch 7. When the lockup clutch 7 is engaged, rotation of the input shaft 8 of the automatic transmission 3 is directly transmitted to the input shaft 10 of the automatic speed change mechanism 5.

The automatic speed change mechanism 5 is provided with a single-pinion planetary gear SP and a Ravigneaux type planetary gear unit PU on the input shaft 10. The planetary gear SP includes a sun gear S1, a carrier CR1, and a ring gear R1, and has a pinion P1 on the carrier CR1. The pinion P1 meshes with the sun gear S1 and the ring gear R1. The planetary gear unit PU has four rotary elements, which are a sun gear S2, a sun gear S3, a carrier CR2, and a ring gear R2. The planetary gear unit PU has a long pinion PL and a short pinion PS on the carrier CR2 so that the long pinion PL and the short pinion PS mesh with each other. The long pinion PL meshes with the sun gear S2 and the ring gear R2, and the short pinion PS meshes with the sun gear S3.

The sun gear S1 of the planetary gear SP is fixed to a transmission case 9, and the ring gear R1 is connected to the input shaft 10. The carrier CR1 meshes with the sun gear S1 and the ring gear R1, and provides reduced rotation that results from reducing input rotation. The carrier CR1 is connected to a clutch C-1 (a friction engagement element) and a clutch C-3 (a friction engagement element).

On the other hand, the sun gear S2 of the planetary gear unit PU is connected to a brake B-1 (a friction engagement element), and is connected also to the clutch C-3, and thus, is connected to the carrier CR1 via the clutch C-3. The sun gear S3 is connected to the clutch C-1, and thus, is connected to the carrier CR1 via the clutch C-1. Moreover, the carrier CR2 is connected to a clutch C-2 (a friction engagement element), and thus, is connected to the input shaft 10 via the clutch C-2. The carrier CR2 is connected also to a one-way clutch F-1 and a brake B-2 (a friction engagement element). The ring gear R2 is connected to a counter gear (an output shaft) 11, and the counter gear 11 is connected to driving wheels via a counter shaft and a differential unit, which are not shown.

The clutches C-1 to C-3, the brakes B-1 to B-2, and the one-way clutch F-1 are operated as shown in the operation table of FIG. 2 at the first to sixth forward speeds and the reverse speed, whereby the automatic transmission 5 structured as described above achieves the gear ratio of each shift speed with a satisfactory step ratio. Shift control is performed by changing the engagement/disengagement states of the clutches C-1 to C-3 and the brakes B-1 to B-2.

Note that the oil pressures of the clutches and the brakes which are operated in each shift speed can be set to values that are determined in view of a safety factor with respect to input torque. Thus, for example, even if another clutch or brake is engaged at the same time, and three of the clutches and brakes are engaged simultaneously as a result, one of those three clutches and/or brakes slips, and basically an up-shift speed is attained (not published at the time of filing the present application; PCT International Application PCT/JP2008/67722).

An overview of the structure of the control apparatus 1 for the automatic transmission according to the present invention will be described below with reference to FIG. 3.

Figure 3:
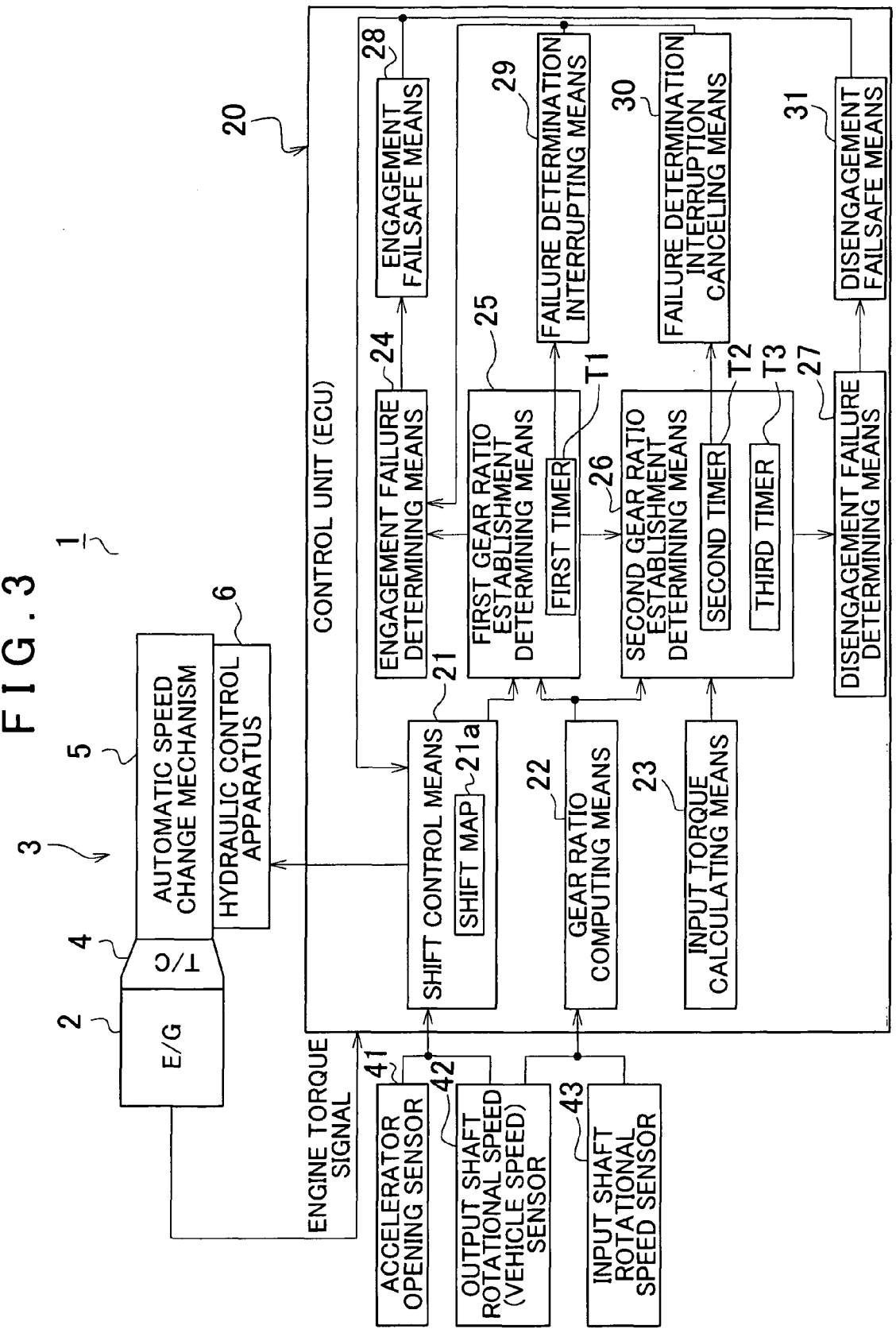
FIG. 3 is a block diagram showing a control apparatus for the automatic transmission according to the present invention.

As shown in FIG. 3, the control apparatus 1 for the automatic transmission has a control unit (ECU) 20. An accelerator opening sensor 41, an output shaft rotational speed (vehicle speed) sensor 42, an input shaft rotational speed sensor 43, and the like are connected to the control unit 20. The control unit 20 is provided with a shift control unit 21 having a shift map 21a, a gear ratio computing unit 22, an input torque calculating input 23, an engagement failure determining input 24, a first gear ratio establishment determining unit 25 having a first timer T1, a second gear ratio establishment determining unit 26 having a second timer T2 and a third timer T3, a disengagement failure determining unit 27, an engagement failsafe unit 28, a failure determination interrupting unit 29, a failure determination interruption canceling unit 30, and a disengagement failsafe unit 31.

Note that a hydraulic control apparatus 6 is provided with a plurality of linear solenoid valves (not shown), each capable of adjusting and outputting a corresponding oil pressure according to an electronic command from the control unit 20 (the shift control unit 21). The hydraulic control apparatus 6 is thus structured so as to be able to control the engagement/disengagement states of the clutches and the brakes as desired, that is, so as to be able to change the shift speed as desired, by adjusting, as desired, oil pressures $P_{C1}$, $P_{C2}$, $P_{C3}$, $P_{B1}$, and $P_{B2}$ for respective hydraulic servos (not shown) of the clutches C-1, C-2, C-3 and the brakes B-1, B-2 of the above automatic speed change mechanism 5.

When the operation mode is an automatic shift mode based on, e.g., the operation position of a shift lever, not shown, or the like, the shift control unit 21 refers to the shift map 21a based on an accelerator opening θd, which is detected by the accelerator opening sensor 41, and a rotational speed Nout of the output shaft (the counter gear 11) (i.e., a vehicle speed V), which is detected by the output shaft rotational speed sensor 42, and determines an optimal shift speed. Note that, in the shift map 21a, a shift point (an up-shift point and a down-shift point) for each shift speed is recorded in advance together with the corresponding accelerator opening θd and output shaft rotational speed Nout.

The gear ratio computing unit 22 computes, as needed, an actual gear ratio (a shift ratio) based on the output shaft rotational speed Nout detected by the output shaft rotational speed sensor 42 and the rotational speed Nin of the input shaft 10 detected by the input shaft rotational speed sensor 43. The input torque calculating unit 23 calculates input torque Tin applied to the input shaft 10, based on, e.g., an engine torque signal from the engine 2.

The first gear ratio establishment determining unit 25 determines whether the actual gear ratio computed by the gear ratio computing unit 22 is any one of the gear ratios of a plurality of shift speeds (more specifically, if the actual gear ratio has been within a predetermined range "±α" of the gear ratio of the one shift speed) during a first predetermined time Ta measured by the first timer T1 after completion of a shifting operation (more specifically, after actual completion of the shifting operation; after the lapse of a fixed time T0 since issuance of a command to end the shifting operation).

If the gear ratio computed by the gear ratio computing unit is different from an intended gear ratio that is supposed to be established by the shifting operation (a target gear ratio that is normally established by the shifting operation) (more specifically, if the computed gear ratio is not within the predetermined range "±α" of the intended gar ratio) based on the determination result of the first gear ratio establishment determining unit 25, or more specifically, based on the determination result of the second gear ratio establishment determining unit 26 described below, it means that a shift speed that is different from the target shift speed has been established. Thus, the engagement failure determining unit 24 determines that a failure has occurred. More specifically, the engagement failure determining unit 24 determines that a clutch or a brake (a friction engagement element), which is supposed to be disengaged by the shifting operation, is in an engaged state. Note that if the computed gear ratio is equal to the intended gear ratio, it means that the shifting operation has been performed normally. Thus, the engagement failure determining unit 24 makes no failure determination.

If the engagement failure determining unit 24 determines that such a failure has occurred that a clutch or a brake, which is supposed to be disengaged by changing the engagement/disengagement states of the clutches and the brakes (that is, by the shifting operation), is in an engaged state (hereinafter referred to as an "engagement failure"), the engagement failsafe unit 28 performs shift control to attain a shift speed at which this engaged friction engagement element is used. That is, as shown in FIG. 2, if a gear ratio that is different from a target gear ratio is established in, e.g., shifting from the fourth to fifth forward speed (4-5 shifting), the clutch C-1 has an engagement failure. Thus, the engagement failsafe unit 28 performs shift control to attain one of the first to fourth forward speeds according to the vehicle speed. If a gear ratio that is different from a target gear ratio is established in, e.g., shifting from the fourth to third forward speed (4-3 shifting), the clutch C-2 has an engagement failure. Thus, the engagement failsafe unit 28 performs shift control to attain one of the fourth to sixth forward speeds according to the vehicle speed. If a gear ratio that is different from a target gear ratio is established in, e.g., shifting from the third to second forward speed (3-2 shifting), shifting from the fifth to sixth forward speed (5-6 shifting), the clutch C-3 has an engagement failure. Thus, the engagement failsafe unit 28 performs shift control to attain the third or fifth forward speed according to the vehicle speed. If a gear ratio that is different from a target gear ratio is established in, e.g., shifting from the second to third forward speed (2-3 shifting) or shifting from the sixth to fifth forward speed (6-5 shifting), the brake B-1 has an engagement failure. Thus, the engagement failsafe unit 28 performs shift control to attain the second or sixth forward speed according to the vehicle speed. Note that, since the brake B-2 uses the same linear solenoid valve as that of the clutch C-2 in the hydraulic control apparatus 6, the brake B-2 structurally does not have an engagement failure in any case in the present embodiment.

If the first gear ratio establishment determining unit 25 determines that none of the gear ratios of the shift speeds has been established during the first predetermined time Ta, that is, if the actual gear ratio is between the gear ratios of the shift speeds, and it cannot be determined whether establishment of the shift speed is delayed or a neutral state has been established, the failure determination interrupting unit 29 sends to the engagement failure determining unit 24 a command to interrupt the failure determination.

While the failure determination by the engagement failure determining unit 24 is being interrupted by the failure determination interrupting unit 29, during a third predetermined time Tc measured by the third timer T3 after the interruption of the failure determination, the second gear ratio establishment determining unit 26 determines whether the gear ratio of any one of the shift speeds has been established (more specifically, an actual gear ratio has been within a predetermined range "±α" of the gear ratio of the one shift speed) for a second predetermined time Tb measured by the second timer T2. The second gear ratio establishment determining unit 26 also determines whether the input torque Tin calculated by the input torque calculating unit 23 is equal to or higher than predetermined torque Tt. That is, in order to accurately determine whether the neutral state has been established, it is preferable to determine whether the input torque Tin is equal to or higher than the predetermined torque Tt, and if the gear ratio of any one of the shift speeds has been established for the second predetermined time Tb. Note that the second timer T2 is started when the actual gear ratio falls within the predetermined range "±α" of the gear ratio of the one shift speed, and is reset when the actual gear ratio is no longer within the predetermined range "±α" of the gear ratio of that shift speed.

If the second gear ratio establishment determining unit 26 determines that the gear ratio of any one of the shift speeds has been established for the second predetermined time Tb, the failure determination interruption canceling unit 30 cancels the interruption of the failure determination of the engagement failure determining unit 24. That is, in response to this cancellation, the engagement failure determining unit 24 compares the computed gear ratio with an intended gear ratio that is supposed to be established by the shifting operation, as described above. If the computed gear ratio is different from the intended gear ratio, the engagement failure determining unit 24 determines that an engagement failure has occurred. The engagement failure determining unit 24 makes no failure determination if the computed gear ratio is equal to the intended gear ratio.

On the other hand, if the second gear ratio establishment determining unit 26 determines that none of the gear ratios of the shift speeds has been established for the second predetermined time Tb during the third predetermined time Tc after interruption by the failure determination interrupting unit 29 of the failure determination of the engagement failure determining unit 24, it means that the gear ratio has not been stabilized for any period (Tb) during the third predetermined time Tc. Thus, it is very likely that the neutral state has been established. Thus, the disengagement failure determining unit 27 determines that such a failure has occurred that a clutch or a brake, which is supposed to be engaged when changing the engagement/disengagement states of the clutches and the brakes, is in a disengaged state (hereinafter referred to as a "disengagement failure").

If the disengagement failure determining unit 27 determines that a clutch or a brake, which is supposed to be engaged when changing the engagement/disengagement states of the clutches and the brakes, has a disengagement failure, the disengagement failsafe unit 31 performs shift control to attain a shift speed at which this disengaged friction engagement element is not used. That is, as shown in FIG. 2, if the neutral state is established in, e.g., shifting from the fifth to fourth forward speed (5-4 shifting), the clutch C-1 has a disengagement failure. Thus, the disengagement failsafe unit 31 performs shift control to attain the fifth or sixth forward speed according to the vehicle speed. If the neutral state is established in, e.g., shifting from the third to fourth forward speed (3-4 shifting), the clutch C-2 has a disengagement failure. Thus, the disengagement failsafe unit 31 performs shift control to attain one of the first to third forward speeds according to the vehicle speed. If the neutral state is established in, e.g., 2-3 shifting or 6-5 shifting, the clutch C-3 has a disengagement failure. Thus, the disengagement failsafe unit 31 performs shift control to attain one of the first and second forward speeds, the fourth forward speed, and the sixth forward speed according to the vehicle speed. If the neutral state is established in, e.g., shifting from the first to second forward speed (1-2 shifting) or 5-6 shifting, the brake B-1 has a disengagement failure. Thus, the disengagement failsafe unit 31 performs shift control to attain one of the first forward speed and the third to fifth forward speeds according to the vehicle speed. Note that, even if the brake B-2 has a disengagement failure, merely the engine brake of the first forward speed cannot be obtained. Thus, in this case, normal shift control can be performed in the substantially same manner as in the case of no failure.

An example of failure determination control by the control apparatus 1 for the automatic transmission will be described with reference to FIGS. 3 to 5.

Figure 4:
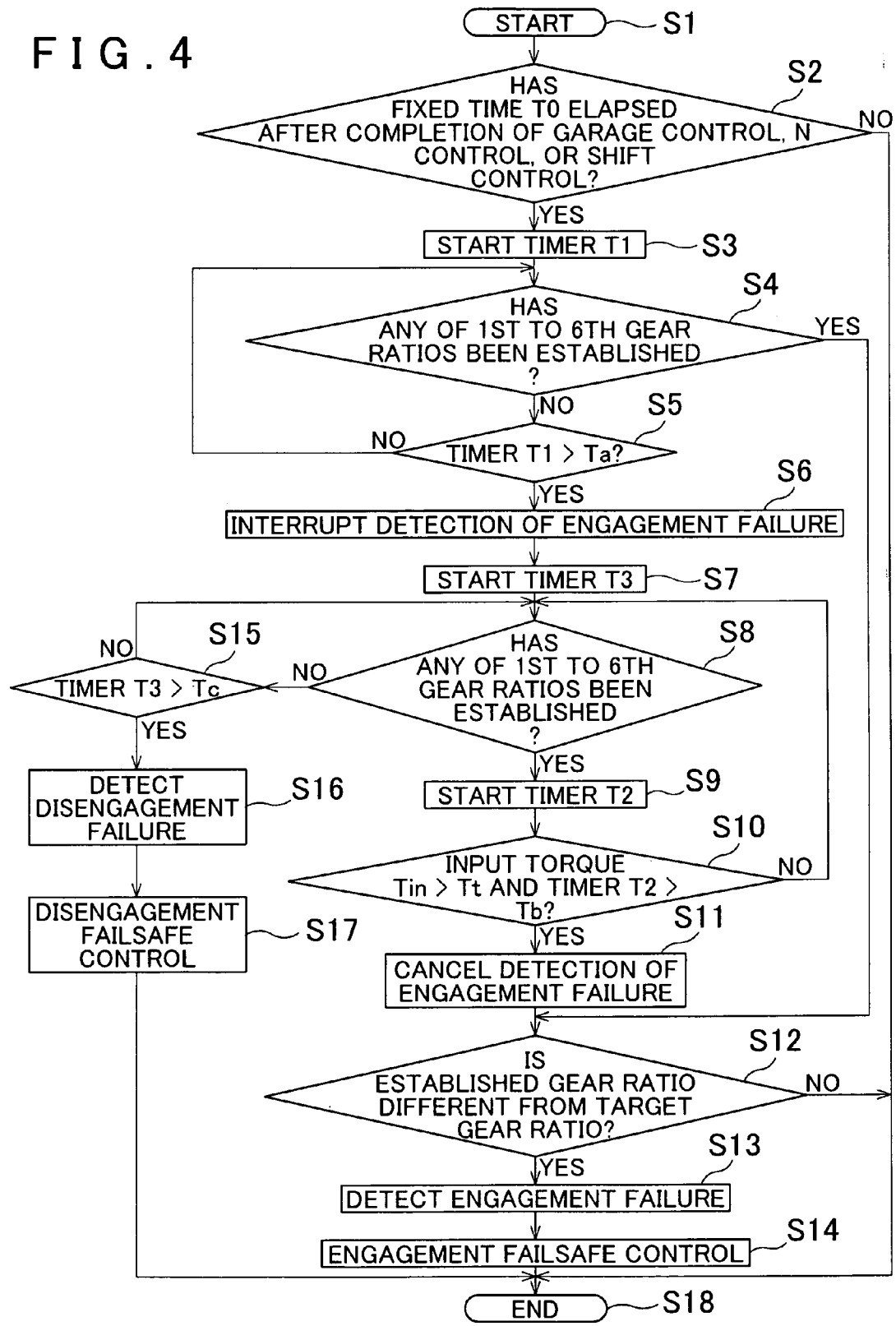
FIG. 4 is a flowchart illustrating failure determination control according to the present invention.

As shown in FIG. 5, if 3-4 shift control (shifting from the third to fourth forward speed) is started at time t1, and the shift control unit 21 determines that the 3-4 shift control is completed at time t2, the failure determination control is started (S1 in FIG. 4). First, it is determined whether a fixed time T0 has elapsed since the completion of the shift control (S2, S18 in FIG. 4). This determination is repeatedly made after an electric command to end the shift control is issued until the fixed time T0, during which an oil pressure response is obtained and the shifting operation is actually completed, elapses. Note that the present embodiment will be described below with respect to the case where the fixed time T0 has elapsed since the completion of the shift control. However, the present invention is not limited to this, and may also be applied to the cases where shift control from the neutral state to the first forward speed is performed, such as the case where the fixed time T0 has elapsed since the completion of garage control (especially in the case where the shift range is shifted from the neutral range to a drive range), and the case where the fixed time T0 has elapsed since the completion of N control (control for establishing the neutral state in a drive range).

At time t3 after the elapse of the fixed time T0 since time t2, the first gear ratio establishment determining unit 25 starts the first timer T1 (S3 in FIG. 4), and determines whether the gear ratio of any one of the first to sixth forward speeds ±α has been established (S4 in FIG. 4), and also determines whether at least the first predetermined time Ta has elapsed on the timer T1 (S5 in FIG. 4). That is, if the gear ratio of any one of the shift speeds has been established within the first predetermined time Ta (NO in S5, YES in S4 in FIG. 4), the routine proceeds to step S12 described below. Otherwise (NO in S4, YES in S5 in FIG. 4), the routine proceeds to step S6 described below.

[In the Case Where 3-4 Shifting is Performed Normally]

For example, if 3-4 shifting is performed normally in the shift control performed between time t1 and time t2, the oil pressure of the hydraulic servo of the clutch C-3 is discharged as shown by $P_{C3}'$, and the clutch C-3 is disengaged. At the same time, the oil pressure of the hydraulic servo of the clutch C-2 is increased as shown by $P_{C2}$, and the clutch C-2 is engaged. Thus, the gear ratio falls within the range "±α" of the gear ratio of the fourth forward speed by time t3, as shown by dotted line GearB, and thus, the first gear ratio establishment determining unit 25 determines that the gear ratio has been established within the first predetermined time Ta (YES in S4 in FIG. 4). Then, the engagement failure determining unit 24 determines whether the established gear ratio is different from the target gear ratio that is supposed to be established after the 3-4 shifting (S12 in FIG. 4). In this example, since the established gear ratio is a normal gear ratio of the forth forward speed (NO in S12 in FIG. 4), the failure determination control is terminated (S18 in FIG. 4).

[In the Case Where Simultaneous Engagement Occurs in an Automatic Transmission Including a Cutoff Valve]

On the other hand, if, for example, the oil pressure $P_{C3}$ of the clutch C-3 is not reduced due to, e.g., a failure of a linear solenoid valve (not shown) in the shift control performed between time t1 and time t2, and the oil pressure $P_{C2}$ of the clutch C-2 is increased based on a command to perform 3-4 shift control, an oil pressure is output simultaneously to the respective hydraulic servos of the clutches C-1, C-2, and C-3 at time t2 or later. In the case where the automatic transmission has a cutoff valve for cutting off an oil passage to the clutch C-1 when the oil pressures of the hydraulic servos of the clutches C-1, C-2, and C-3 are applied, the oil pressure of the clutch C-1 is cut off between time t2 and t3, and the clutches C-2 and C-3 are engaged, whereby the fifth forward speed is established (see FIG. 2).

Thus, the gear ratio falls within the range "±α" of the gear ratio of the fifth forward speed by time t3, as shown by solid line GearA, and the first gear ratio establishment determining unit 25 determines that the gear ratio of any one of the shift speeds has been established within the first predetermined time Ta (YES in S4 of FIG. 4). Then, the engagement failure determining unit 24 determines whether the established gear ratio is different from the target gear ratio that is supposed to be established after the 3-4 shifting (S12 in FIG. 4). In this example, since the established gear ratio is a gear ratio of the fifth forward speed, which is different from the target gear ratio of the fourth forward speed (YES in S12 in FIG. 4), the engagement failure determining unit 24 determines that the clutch C-3, which is supposed to be disengaged, has an engagement failure (S13 in FIG. 4). Since the clutch C-3 is in an engaged state (cannot be disengaged), the engagement failsafe unit 28 starts failsafe control so as to select the third or fifth forward speed according to the vehicle speed and the accelerator opening (S14 in FIG. 4), whereby the failure determination control is terminated (S18 in FIG. 4).

[In the Case Where Simultaneous Engagement Occurs in the Automatic Transmission that Prevents Simultaneous Engagement by Hydraulic Control]

If, in, e.g., the shift control performed between time t1 and time t2, the oil pressure $P_{C3}$ of the clutch C-3 is not reduced due to, e.g., a failure of a linear solenoid valve, not shown, and the oil pressure $P_{C2}$ of the clutch C-2 is increased based on a command to perform 3-4 shift control, the state in which all of the clutches C-1, C-2, and C-3 are simultaneously in the engaged state is attained at time t2 or later. In the automatic transmission, the oil pressure $P_{C1}$ of the clutch C-1 is preset to a somewhat lower value. This simultaneous engagement changes the torque transmission path in the automatic speed change mechanism 5, whereby a torque distribution to the clutch C-1 changes, and the clutch C-1 gradually slips by a force that rotates the driving wheels based on the inertial force of the vehicle. Thus, the stall state of the automatic transmission 3 is prevented.

Thus, the gear ratio is gradually stabilized at the gear ratio of the fifth forward speed, as shown by dotted line GearC. On the contrary, in the case where the clutch C-3 is disengaged normally, and the clutch C-2 is in a disengaged state (that is, the clutch C-2 has a disengagement failure), the automatic speed change mechanism 5 is brought into the neutral state in which none of the gear ratios of the shift speeds is allowed to be established. Thus, if the first gear ratio establishment determining unit 25 determines that none of the gear ratios of the shift speeds has been established within the first predetermined time Ta (that is, between time t3 and t4) (NO in S4, YES in S5 in FIG. 4), it cannot be determined at this point whether the clutch C-3 has an engagement failure or the clutch C-2 has a disengagement failure.

Thus, the failure determination interrupting unit 29 interrupts the failure determination that is made by the engagement failure determining unit 24 (S6 in FIG. 4) to prevent an erroneous determination. Then, the second gear ratio establishment determining unit 26 starts the third timer T3 (S7 in FIG. 4), and determines whether the gear ratio of any one of the first to sixth forward speeds ±α has been established (S8 in FIG. 4). If none of the gear ratios of the first to sixth forward speeds has been established (NO in S8 in FIG. 4), the second gear ratio establishment determining unit 26 determines whether at least the third predetermined time Tc has elapsed on the timer T3 (S15 in FIG. 4). On the other hand, if any one of the gear ratios of the first to sixth forward speeds has been established before the third predetermined time Tc elapses (YES in S8 in FIG. 4), the second gear ratio establishment determining unit 26 also starts the second timer T2 (S9 in FIG. 4), and determines whether the input torque Tin that is applied to the input shaft 10 is equal to or higher than the predetermined torque Tt, and if at least the second predetermined time Tb has elapsed on the timer T2 (S10 in FIG. 4).

That is, if the neutral state where, e.g., the clutch C-2 has a disengagement failure, and the input torque Tin is equal to or higher than the predetermined torque Tt, the rotational speed increases rapidly, and none of the gear ratios of the shift speeds is supposed to be established. However, if the input torque Tin is less than the predetermined torque Tt, there is a possibility that the input shaft rotational speed Nin becomes stable by revving up the engine in the idling state, and the gear ratio is established by accident. Thus, any determination that is made when the input torque Tin is less than the predetermined torque Tt is excluded.

For example, in the present embodiment, the gear ratio is gradually stabilized at the fifth forward speed, as shown by broken line GearC. Thus, the gear ratio crosses the gear ratio of the fourth forward speed before reaching the gear ratio of the fifth forward speed. When the gear ratio is crossing the gear ratio of the fourth forward speed, the gear ratio is established (YES in S8 in FIG. 4), and counting by the second timer T2 is started (S9 in FIG. 4). However, the gear ratio of the fourth forward speed is not established any more before the elapse of the second predetermined time Tb (NO in S10, NO in S8 in FIG. 4).

Then, when the gear ratio becomes equal to the gear ratio of the fifth forward speed at time t5 as shown by dotted line GearC, the second gear ratio establishment determining unit 26 determines that one of the gear ratios of the shift speeds has been established before the third predetermined time Tc elapses (YES in S8 in FIG. 4), starts counting by the timer T2 (S9 in FIG. 4), and determines that the input torque Tin that is applied to the input shaft 10 is equal to or higher than the predetermined torque Tt, and at least the second predetermined time Tb has elapsed on the second timer T2 (YES in S10 in FIG. 4). Then, the failure determination interruption canceling unit 30 cancels (S11 in FIG. 4) the failure determination that has been interrupted by the failure determination interrupting unit 29 (see S6 in FIG. 4), and causes the engagement failure determining unit 24 to make a failure determination again. The engagement failure determining unit 24 determines whether the established gear ratio is different from the target gear ratio that is supposed to be established after 3-4 shifting (S12 in FIG. 4). In this example, the gear ratio is the gear ratio of the fifth forward speed, which is different from the target gear ratio of the fourth forward speed (YES in S12 in FIG. 4). Thus, the engagement failure determining unit 24 determines that the clutch C-3 that is supposed to be disengaged has an engagement failure (S13 in FIG. 4). As described above, since the clutch C-3 is in an engaged state (cannot be disengaged), the engagement failsafe unit 28 starts failsafe control so as to select the third or fifth forward speed according to the vehicle speed and the accelerator opening (S14 in FIG. 4), and the control is terminated (S18 in FIG. 4).

[In the Case Where the Neutral State is Established by a Disengagement Failure]

If, in, e.g., the shift control performed between time t1 and time t2, the oil pressure $P_{C2}$ of the clutch C-2 is not increased due to, e.g., a failure of a linear solenoid valve, not shown, and the oil pressure of the clutch C-3 is increased as shown by P' based on a command to perform 3-4 shift control, the state in which only the clutch C-1 is engaged, and the clutches C-2 and C-3 are disengaged is attained at time t2 or later. Thus, none of the shift speeds is attained, and the neutral state is established (see FIG. 2).

In this case, none of the gear ratios of the shift speeds is established unless especially the driver revs up the engine in the idling state so that the engine rotational speed becomes stable. Thus, the first gear ratio establishment determining unit 25 determines that none of the gear ratios of the shift speeds has been established during the first predetermined time Ta (NO in S4, YES in S5 in FIG. 4), and the failure determination interrupting unit 29 interrupts the failure determination about an engagement failure by the engagement failure determining unit 24. Moreover, the second gear ratio establishment determining units 26 determines, during the third predetermined time Tc, that none of the gear ratios of the shift speeds has been established for the second predetermined time Tb (NO in S8, NO in S10, YES in S15 in FIG. 4). Thus, since none of the gear ratios of the shift speeds has been established even when the third predetermined time Tc has elapsed since time t4, the disengagement failure determining unit 27 determines that the clutch C-2 has a disengagement failure (S16 in FIG. 4). Since the clutch C-2 is in a disengaged state (cannot be engaged), the disengagement failsafe unit 31 starts failsafe control so as to select one of the first to third forward speeds according to the vehicle speed and the accelerator opening (S17 in FIG. 4), whereby the control is terminated (S18 in FIG. 4).

As described above, according to the control apparatus 1 of the automatic transmission, if the first gear ratio establishment determining unit 25 determines that one of the gear ratios of a plurality of shift speeds has been established during the first predetermined time Ta after the completion of the shifting operation (time t3), and the engagement failure determining unit 24 determines that the computed gear ratio is different from the target gear ratio that is supposed to be obtained by the shifting operation, it can be determined that a friction engagement element, which is supposed to be disengaged by the shifting operation, is in an engaged state. That is, it can be determined that this friction engagement element has an engagement failure. Thus, failsafe control corresponding to the engagement failure (the failure in which the friction engagement element is wrongly in an engaged state) can be quickly executed.

On the other hand, if the first gear ratio establishment determining unit 25 determines that none of the gear ratios of the shift speeds has been established during the first predetermined time Ta after actual completion of the shifting operation, the failure determination interrupting unit 29 interrupts the failure determination of the engagement failure determining unit 24. Thus, the state where it is taking a long time for the gear ratio to be stabilized although a friction engagement element has an engagement failure can be prevented from being erroneously determined to be a disengagement failure (a failure in the neutral state).

Moreover, if the second gear ratio establishment determining unit 26 determines that any one of the gear ratios of the gear speeds has been established for the second predetermined time Tb while the failure determination of the engagement failure determining unit 24 has been interrupted by the failure determination interrupting unit 29, the failure determination interruption canceling unit 30 cancels the interruption of the failure determination of the engagement failure determining unit 24, and the engagement failure determining unit 24 determines that a friction engagement element, which is supposed to be disengaged by the shifting operation, is in an engaged state, that is, the friction engagement element has an engagement failure. Thus, an engagement failure (a failure in which a friction engagement element is in an engaged state) can be accurately determined, whereby corresponding failsafe control can be reliably executed.

Thus, by accurately interrupting the failure determination and accurately canceling the interruption, the accuracy of the failure determination can be increased, and the state where a failure has occurred can be reliably and quickly determined as a failure. Thus, the failure determination can be made quickly, and corresponding failsafe control can be reliably and quickly executed.

Moreover, if it is determined that one of the gear ratios of the shift speeds has been established for the second predetermined time Tb, and it is determined that the input torque Tin that is applied to the input shaft 10 is equal to or higher than the predetermined torque Tt, the failure determination interruption canceling unit 30 cancels interruption of the failure determination of the engagement failure determining unit 24. Thus, the states other than the neutral state can be accurately excluded, and an engagement failure (a failure in which a friction engagement element is in an engaged state) can be more accurately determined.

Moreover, the control apparatus 1 includes the engagement failsafe unit 28. Thus, if the engagement failure determining unit 24 determines that a friction engagement element, which is supposed to be disengaged when changing the engagement/disengagement states of the friction engagement elements, is in an engaged state (an engagement failure), failsafe control can be executed by performing shift control to attain a shift speed at which this engaged friction engagement element is used.

On the other hand, if the second gear ratio establishment determining unit 26 determines that none of the gear ratios of the shift speeds has been established for the second predetermined time Tb during the third predetermined time Tc after interruption by the failure determination interrupting unit 29 of the failure determination of the engagement failure determining unit 24, the disengagement failure determining unit 27 determines that a friction engagement element, which is supposed to be engaged when changing the engagement/disengagement states of the friction engagement elements, is in a disengaged state (a disengagement failure). Thus, a disengagement failure (a failure in which a friction engagement element is in a disengaged state) can be accurately determined, and corresponding failsafe control can be reliably executed.

Moreover, the control apparatus 1 includes the disengagement failsafe unit 31. Thus, if the disengagement failure determining unit 27 determines that a friction engagement element, which is supposed to be engaged when changing the engagement/disengagement states of the friction engagement elements, is in a disengaged state (a disengagement failure), failsafe control can be executed by performing shift control to attain a shift speed at which this disengaged friction engagement element is not used.

Note that, in the above embodiment described, a multistage automatic transmission capable of attaining six forward speeds and one reverse speed has been described as an example of the automatic transmission 3, to which the control apparatus 1 can be applied. However, the present invention may also be applied to, e.g., an automatic transmission that attains eight forward speeds and one reverse speed (or two reverse speeds). The present invention is not limited to this, and may be applied to any multistage automatic transmissions.

In the above embodiment, a 3-4 up-shift operation has been mainly described as an example. However, it is to be understood that the present invention is not limited to this, and the present invention may be applied to other up-shift operations and down-shift operations, and also to the case where a shift speed is attained from the neutral state.

The control apparatus of the automatic transmission according to the present invention can be used for automatic transmissions that are mounted on automobiles or the like, and is preferably used especially in multistage automatic transmissions that are required to quickly and accurately make a failure determination after a shifting operation.

The invention claimed is:

1. A control apparatus for an automatic transmission including an automatic speed change mechanism that has an input shaft connected to a drive source, an output shaft connected to driving wheels, and a plurality of friction engagement elements, and that performs a shifting operation among a plurality of shift speeds by changing engagement/disengagement states of the plurality of friction engagement elements, the control apparatus comprising:

a gear ratio computing unit that computes, as needed, a gear ratio based on a rotational speed of the input shaft and a rotational speed of the output shaft;

a first gear ratio establishment determining unit that determines whether the gear ratio computed by the gear ratio computing unit is one of gear ratios of the plurality of shift speeds, during a first predetermined time after completion of the shifting operation;

an engagement failure determining unit that determines that such a failure has occurred that one of the friction engagement elements, which is supposed to be disengaged by the shifting operation, is in an engaged state, if the gear ratio computed by the gear ratio computing unit is different from a target gear ratio that is supposed to be established after the completion of the shifting operation;

a failure determination interrupting unit that interrupts the failure determination of the engagement failure determining unit, if the first gear ratio establishment determining unit determines that none of the gear ratios of the shift speeds has been established during the first predetermined time;

a second gear ratio establishment determining unit that determines, while the failure determination of the engagement failure determining unit has been interrupted by the failure determination interrupting unit, whether any one of the gear ratios of the shift speeds has been established for a second predetermined time; and a failure determination interruption canceling unit that cancels the interruption of the failure determination of the engagement failure determining unit, if the second gear ratio establishment determining unit determines that one of the gear ratios of the shift speeds has been established for the second predetermined time.

2. The control apparatus according to claim 1, further comprising:

an input torque calculating unit that calculates torque that is applied to the input shaft, wherein the failure determination interruption canceling unit cancels the interruption of the failure determination of the engagement failure determining unit, if it is determined that one of the gear ratios of the shift speeds has been established for the second predetermined time, and that the input torque that is applied to the input shaft is equal to or higher than predetermined torque.

3. The control apparatus according to claim 1, further comprising:

an engagement failsafe unit that performs, if the engagement failure determining unit determines that such a failure has occurred that one of the friction engagement elements, which is supposed to be disengaged when changing the engagement/disengagement states of the plurality of friction engagement elements, is in an engaged state, shift control to attain a shift speed at which the one engaged friction engagement element is used.

4. The control apparatus according to claim 1, further comprising:

a disengagement failure determining unit that determines that such a failure has occurred that one of the friction engagement elements, which is supposed to be engaged when changing the engagement/disengagement states of the plurality of friction engagement elements, is in a disengaged state, if the second gear ratio establishment determining unit determines that none of the gear ratios of the shift speeds has been established for the second predetermined time during a third predetermined time after the interruption by the failure determination interrupting unit of the failure determination of the engagement failure determining unit.

5. The control apparatus according to claim 4, further comprising:

a disengagement failsafe unit that performs, if the disengagement failure determining unit determines that such a failure has occurred that one of the friction engagement elements, which is supposed to be engaged when changing the engagement/disengagement states of the plurality of friction engagement elements, is in a disengaged state, shift control to attain a shift speed at which the one disengaged friction engagement element is not used.

* * * * *